United States Patent

Nemecek et al.

[11] 3,966,339
[45] June 29, 1976

[54] FASTENERS

[76] Inventors: Borivoj Nemecek, 306 Dorset Square, Hillbrow St. & Harrow Road, Berea, Johannesburg; Jean M. Lipman, 195 Frances St. East, Observatory, Johannesburg, Transvaal, both of South Africa

[22] Filed: Feb. 21, 1975

[21] Appl. No.: 551,648

[52] U.S. Cl. ............................. 403/292; 52/753 E
[51] Int. Cl.² .......................................... F16D 1/00
[58] Field of Search ........... 403/298, 295, 292, 293; 52/753 E

[56] References Cited
UNITED STATES PATENTS

| | | |
|---|---|---|
| 2,328,823 | 9/1943 | MacKenzie .................. 42/753 E X |
| 2,989,788 | 6/1961 | Kessler ............................. 403/295 |
| 3,269,455 | 8/1966 | Gillotti ......................... 403/295 X |
| 3,605,201 | 9/1971 | Peterson ........................... 403/292 |
| 3,719,342 | 3/1973 | Kupersmit ..................... 52/753 E |

FOREIGN PATENTS OR APPLICATIONS 766,815  1/1957  United Kingdom ................ 403/292

*Primary Examiner*—Andrew V. Kundrat
*Attorney, Agent, or Firm*—Oblon, Fisher, Spivak, McClelland & Maier

[57] ABSTRACT

This invention has for its purpose the provision of a plastic dowel fastener designed to give superior attachment of furniture parts in relation to the commonly used wooden dowel. The gripping action of the plastic dowel of the invention is obtained by the provision of a construction of socket gripping fins and stabilizing formations on the elongated dowel body. The fins act to lock the dowel within a socket in a furniture part and the stabilizing formations act to prevent relative movement of the furniture parts which are joined by the plastic dowel.

8 Claims, 4 Drawing Figures

FASTENERS

BACKGROUND OF THE INVENTION

This invention relates to fasteners of the kind used to join constructional elements in the manufacture of furniture or similar structures. More particularly, the invention is concerned with substitutes for wooden dowels.

SUMMARY OF THE INVENTION

It is an object of the invention to provide a dowel like fastener of a polymer material which will provide a good and rigid connection at a commercially competitive price relative to wooden dowels.

According to the invention, a dowel fastener of one piece construction formed from suitably high impact strength polymer material comprises a profiled elongated body, the body profile providing at least one raised stabilising formation operative to stabilise the fastener in a socket therefor, and spaced radially outwardly tapering peripheral socket gripping fins extending radially beyond the stabilising formation and on either side of the center of the body so that the construction is adapted for insertion from either end into a socket of slightly smaller diameter than that of the fins.

Preferably the stabilising formation is in the nature of a peripheral plateau of circular cross-section, such that the surface of the plateau engages the wall of the socket in a loop or band extending therearound or at least is closely spaced from the socket wall so that very small relative lateral movement of the fastener and socket brings the formation into contact with the socket wall.

Where a single stabilising formation is provided, it should be positioned on the fastener so as to extend partially into each of the sockets of mating constructional elements to be joined. Thus, a single raised formation will normally be positioned centrally on the elongated body and be inserted one half into one element and the other half into the other element.

In the preferred construction of the fastener, according to the invention, spaced stabiliser formations are provided, one towards each end of the rod.

Thus, in the fastener as it is conceived in its most effective form, an arrangement of three spaced stabiliser formations is provided on the elongated body, one formation being centrally located on the body and one being located towards each end thereof. The diameters of the formations are the same and they determine the socket size for which the fastener is to be used.

The spaced peripheral fins on the body may be located in the gaps between the stabilising formations as well as between the end formations and the ends of the body. The fins act to grip the socket walls in the respective furniture elements so that the latter cannot be separated unless great force is applied and the stabiliser formations act to prevent relative play between the elements.

BRIEF DESCRIPTION OF THE DRAWNGS

In order to illustrate the invention, examples thereof will now be described with reference to the accompanying drawings in which.

DETAILED DESCRIPTION OF THE PREFERRED EMBODIMENTS

Figure 1:
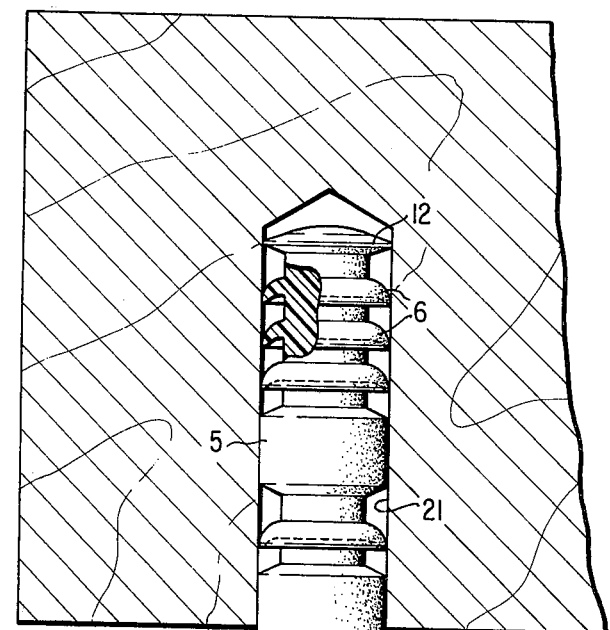
FIG. 1 is a sectional view taken through two furniture elements, with some parts broken away, to be joined by means of the dowel fastener of the invention.
Figure 2:
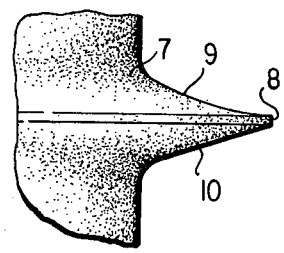
FIG. 2 is an enlarged detail of a part of the fastener.

Referring now to FIGS. 1 and 2 of the drawings, the fastener 1 comprises an article which is injection moulded from a low moisture regain nylon material, such as one obtained by condensation of hexamethylene diamine with adipic acid. The fastener comprises a profiled elongated core or body 2 provided with spaced circular peripheral plateaux formations 3, 4 and 5. The middle formation 4 is centrally located on the body 2.

Between the ends of the body 2 and formations 3 and 5, and also between the formations themselves, the body is provided with peripheral socket gripping fins 6 which taper from their root zones 7 to their apices 8. It will be seen that in their unstressed state the fins on either side of the central formation 4 lean towards the central formation 4 in that the walls 9 of the fins which face the formation 4 are concave while the outer walls 10 of the fins are not concave, or at least are less so. The fins 11 and 12 at either end of the body 2 are somewhat smaller in diameter than the rest of the fins so that the fastener end is easily insertable into a socket.

In use, the fastener is inserted into sockets 20 and 21 provided in furniture elements 22 and 23, respectively. Since the fastener is symmetrical, it may be inserted from either end. The diameter of the sockets is slightly larger than that of the formations 3, 4 and 5, but slightly smaller than the diameter of the fins 6. The fastener, which may be coated with an adhesive, is tapped into position, say, in the socket 21, so that substantially half of the fastener is located in this socket. During insertion, the fins 6 are bent, as illustrated, and also give a good grip against the socket wall so that the fastener is securely located in the socket against extraction. Furthermore, the formations 5 and 4 engage the wall of the socket or at least are very closely spaced from the socket walls and thereby act to stabilise the fit so that the fastener is not able to cant within the socket. Thereafter, the second element 22 is abutted hard up against the element 23 so that the fastener also enters the socket 20 to provide a similar fit therein. In this way, an extremely good connection between the elements is derived which prevents relative play therebetween and which would require a substantial force to separate.

The fastener of the above example has been found to be a satisfactory replacement of the normal dowl which is glued in position or of mortice and tennon joints. It is extremely simple and easy to use and reduces the cost of assembling articles of furniture in which a substantial number of joints are utilised. Furthermore, the fastener makes it possible to assemble an article of furniture without the use of specialised equipment and an article may therefore be transported in dismantled condition ready to be assembled on site by the use of fasteners suitably matched with the particular size of hole employed in the timber members.

Figure 3:
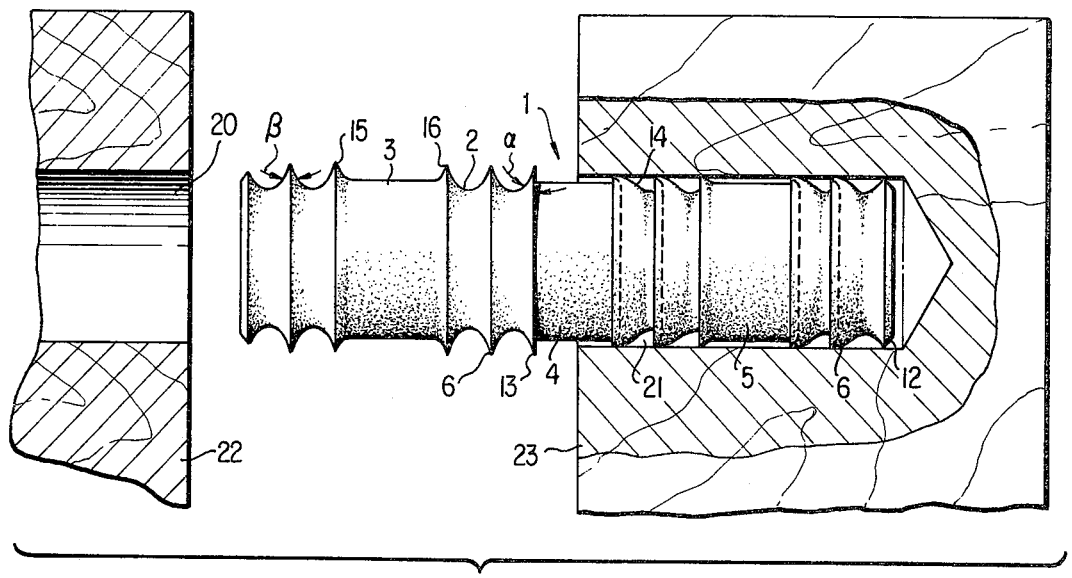
FIG. 3 is a side elevation of an alternative form of dowel fastener to that illustrated in FIG. 1.

Referring now to FIG. 3, in which parts similar to those of FIG. 1 have the same reference numerals, it will be seen that the central plateau formation 4 has adjoining "key" fins 13 and 14. The other formations 3 and 5 also have adjoining fins 15 and 16, but the difference between these and the fins 6 from the key fins is that the latter are more rigid. This is due to the fact that the included apex angle of all the fins is about the same, in this case 30°, but the key fins have vertical faces opposite the formation 4. The key fins thus provide a more rigid lock against the socket walls.

In an example of a dowel of FIG. 3 for use with 8 mm drilled sockets, the dowel may have the following dimensions:

| | |
|---|---|
| Diameter of plateaux formations | = 7.8 mm |
| Diameter of the body | = 5.6 mm |
| Diameter of the fins | = 9.0 mm |
| Diameter of the end fins | = 7.6 mm |
| Space between the fins | = 2.0 mm |
| Length of plateaux formations | = 4.5 mm |
| Length of fastener | = 30 mm |
| Includes angle $\alpha$ or $\beta$ | = 30° |

Figure 4:
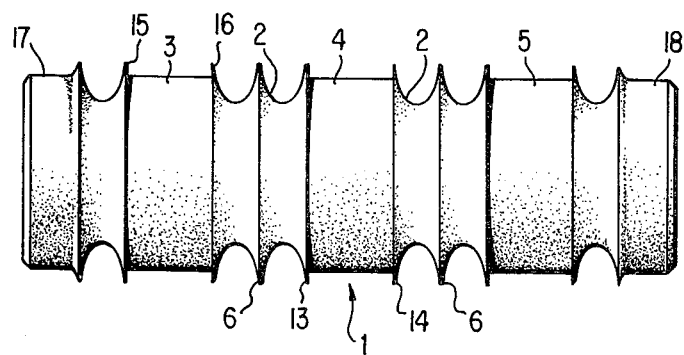
FIG. 4 is a side elevation of yet another alternative form of a dowel fastener according to this invention.

Referring now to FIG. 4 the dowel fastener, in which parts similar to those of FIG. 3 have the same reference numerals, has end plateaux formations 17 and 18. These formations not only act to stabilise the fastener in its socket 20, 21 after the members 22, 23 have been joined, but also enable the fastener to be gripped reasonably securely when only the end of the fastener is thrust into a socket at the beginning of a joining operation. The fastener of this embodiment is injection moulded from polypropylene which, although not possessing the same degree of toughness as nylon, has been found to be quite adequate in strength and is preferred in view of the relatively low cost of the material.

Obviously many variations and modifications of the present invention are possible in light of the above teachings. It is therefore to be understood that within the scope of the appended claims, the present invention may be practiced otherwise than as specifically described herein.

We claim:

1. A dowel fastener of one piece construction formed from suitably high impact strength polymer material comprising a profiled elongated body, the body having a raised central stabilizing formation extending thereform and further raised stabilizing formations which are spaced from the central stabilizing formation and are located towards each end of the body, the said stabilizing formations being operative to stabilize the fastener in a socket therefor, and spaced radially outwardly extendng flexible socket gripping fins extending from and tapering outwardly from the body radially beyond the stabilizing formations and being spaced apart longitudinally on either side of the central stabilizing formation so that the construction is adapted for insertion from either end into a socket of slightly smaller diameter than that of the fins.

2. The fastener of claim 1 in which each of the stabilising formations comprises a peripheral plateau on the body, the plateau being of circular cross-section.

3. The fastener of claim 1 in which the fins have concave faces on their sides facing the centre of the body.

4. The fastener of claim 1 in which the polymer comprises low moisture regain nylon material.

5. The fastener of claim 1 in which the polymer comprises polypropylene.

6. The fastener of claim 1, wherein at least one of said fins, on either side of the central stablizing formation, has an unstressed cross-sectional shape tending to lean toward the central stabilizing formation.

7. The fastener of claim 6, wherein said unstressed cross-sectional shape includes a fin wall of given concavity facing the central stabilizing formation and a fin wall of lesser concavity facing the end of the body.

8. The fastener of claim 6, wherein the fins immediately adjacent the central stabilizing formation have a planar fin wall facing the central stabilizing formation that lies in a plane perpendicular to the body and a fin wall facing the end of the body that forms an acute angle with said plane.

* * * * *